(12) United States Patent
Lindner et al.

(10) Patent No.: US 6,840,053 B2
(45) Date of Patent: Jan. 11, 2005

(54) TEMPERATURE CONTROL USING INFRARED SENSING

(75) Inventors: Bjoern Lindner, Ft. Worth, TX (US); Thien D. Ta, Saginaw, TX (US)

(73) Assignee: Behr America, Inc., Troy, MI (US)

( * ) Notice: Subject to any disclaimer, the term of this patent is extended or adjusted under 35 U.S.C. 154(b) by 110 days.

(21) Appl. No.: 10/351,585

(22) Filed: Jan. 27, 2003

(65) Prior Publication Data

US 2004/0146085 A1 Jul. 29, 2004

(51) Int. Cl.$^7$ .............................................. F25D 21/04
(52) U.S. Cl. ............................ 62/140; 62/156; 62/227; 374/124
(58) Field of Search ......................... 62/128, 140, 151, 62/150, 156, 226, 227, 229; 374/147, 121, 124, 129

(56) References Cited

U.S. PATENT DOCUMENTS

| | | | |
|---|---|---|---|
| 3,961,495 A | 6/1976 | Beauvent et al. | |
| 4,109,481 A | 8/1978 | Peek | |
| 4,232,528 A | 11/1980 | Behr | |
| 4,316,365 A | 2/1982 | Mueller et al. | |
| 4,389,851 A | 6/1983 | Chrostowski et al. | |
| 4,593,533 A | 6/1986 | Alsenz | |
| 4,694,657 A | 9/1987 | Vaughn | |
| 4,959,967 A | 10/1990 | Lanzani | |
| 5,033,272 A | 7/1991 | Yoshikawa et al. | |
| 5,094,544 A | 3/1992 | Ignatowicz | |
| 6,073,457 A | 6/2000 | Kampf et al. | |
| 6,318,107 B1 | 11/2001 | Pandaru et al. | |
| 6,330,802 B1 | 12/2001 | Cummings et al. | |
| 6,434,972 B1 | 8/2002 | Geiger et al. | |
| 6,625,997 B1 * | 9/2003 | Schultz | 62/186 |

OTHER PUBLICATIONS

"Introduction to Infrared Thermometry", Technical Solutions, TS–104, Ircon, Inc., Jul. 2001, pp. 1–7.

* cited by examiner

Primary Examiner—Harry B. Tanner
(74) Attorney, Agent, or Firm—Foley & Lardner LLP

(57) ABSTRACT

A system and method for sensing and controlling the temperature of a heating, ventilation and air conditioning (HVAC) system utilizes an infrared sensor. The infrared sensor is used to detect temperature over several different areas on an evaporator surface on which a cold spot may occur. More preferably, the infrared sensor continuously scans the whole surface on the air outlet side of the evaporator. The sensed temperature is used to detect any cold spots that may dynamically form on the evaporator surface. The system is controlled in response to the detected temperature.

25 Claims, 5 Drawing Sheets

| a | b | c | d | e |
|---|---|---|---|---|
| f | g | h | i | j |
| k | l | m | n | o |
| p | q | r | s | t |

TEMPERATURE CONTROL USING INFRARED SENSING

FIELD OF INVENTION

This invention relates generally a system and method for sensing and controlling the temperature of a heating, ventilation and air conditioning (HVAC) system. More specifically it relates to a system and method for controlling temperature of a vehicle HVAC system using an infrared (IR) sensor.

BACKGROUND OF THE INVENTION

Refrigeration systems, particularly the evaporator coils of refrigerators, air conditioning equipment or heat pump systems, are susceptible to frost accumulation during operation. Frost accumulation is undesirable in that: it decreases the airflow (at times, completely) by blocking the air pass; it decreases the cooling efficiency of the system; it reduces the capacity of the system; and it raises operating cost. The accumulation of ice or frost on evaporator coils in refrigerating equipment is a significant problem. The accumulation insulates the air to be cooled from the cold refrigerating fluid circulating through the evaporator unit, resulting in difficulties in maintaining the refrigerated space at the desired temperature.

One known method for preventing frost accumulation utilizes for a time clock which at some pre-selected time interval switches off the compressor and turns on a thermal heating device adjacent to the evaporator coils to melt the ice or frost. The disadvantage of this technique is that ice or frost does not always accumulate at a constant rate, depending on the ambient humidity and temperature of the air. Further, most clock-actuated defrost systems defrost more often than necessary, out of abundance of caution, in order to eliminate all buildup of ice or frost. This defrosting on a regular time cycle, whether needed or not and, independent of the quantity of accumulated ice or frost, is inefficient and wastes electrical power.

Another method is to simply switch off the compressor for a predetermined length of time generally sufficient to allow the ice or frost to melt. However, the switching off of the compressor permits the temperature in the refrigerated space to rise, which only makes the compressor and its motor work excessively to maintain the desired temperature.

One known de-icing control method used for vehicle HVAC systems involves measuring the temperature at a fixed location in the system, such as in the fin area of an evaporator. For example, a low temperature limit controller or freezestat may be in the fin area which closes when the temperature drops to a predetermined temperature. Alternatively, a negative temperature coefficient (NTC) thermistor may be used. In either case, when it is detected that the temperature at the location of the sensor has dropped to a predetermined level, the compressor is switched off, and the air temperature raises. A predetermined temperature is established to be the maximum air temperature reached before the compressor is switched back on.

One problem associated with such method is that the sensor detects only a single location. A cold spot (i.e., a location cold enough to form ice), however, may occur at different locations over the entire surface, depending on refrigerant charge level, airflow distribution of the unit, airflow level, compressor on/off cycle, and so forth. Thus, the location of a cold spot is unpredictable. If a cold spot develops outside the sensing region, the fixed sensor is not able to sense the coldest spot, and the compressor will not switch off early enough to prevent frost accumulation. To alleviate this problem, the switch temperature may be set to a higher temperature than is optimum temperature (e.g., zero degrees Celsius), but this prevents air temperature from achieving its theoretical lowest temperature.

Another problem is that design limitations may render it difficult to select the proper core and mounting location for the temperature sensor. Further, in some applications, the selected core and system layout do not allow the temperature probe to pierce the core or fins.

Another method of de-icing used in vehicle HVAC systems utilizes measurement of the refrigerant temperature, for example, using an NTC thermistor. While this provides adequate operational results, sensor replacement requires complete removal of the refrigerant. Further, technique requires special precautions when mounting the sensor to prevent the possibility of leakage.

Still another method of controlling a vehicle HVAC involves measuring air side temperature, for example with an NTC thermistor. Such approach, however, does not provide an accurate representation of cold spots that may occur due to the dynamic load and condition of the refrigerant circuit. This problem is particularly acute in larger HVAC units, such as used in trucks.

SUMMARY OF INVENTION

According to one aspect of the invention, a system for sensing temperature for control of an HVAC system includes an evaporator having a surface; at least one infrared sensor configured to detect the temperature of multiple areas of the evaporator surface; and a processor configured to determine whether the detected temperature at at least one of the multiple areas of the evaporator surface is below a threshold temperature; and a controller configured to control operation of the HVAC system in response to a determination as to whether the detected temperature at at least one of the multiple areas of the evaporator surface is below the threshold temperature.

According to another aspect of the invention, the multiple areas encompass substantially the entirety of the air outlet side of the evaporator.

According to another aspect of the invention, the evaporator surface is scanned line by line in a raster pattern. Alternatively, the evaporator surface is divided into regions and the temperature of each region is detected.

According to still another aspect of the invention, the controller adjusts the performance of an HVAC compressor based on a signal obtained from the sensor. For example, the signal may be used in a manner that depends on the type of compressor. The controller may cause a fixed compressor to turn off, or alternatively it may reduce performance of a variable displacement compressor, when the detected temperature of at least one of said multiple areas of the evaporator surface is determined to be below the threshold temperature.

According to yet another aspect of the invention, the predetermined temperature is zero degrees Celsius. The predetermined temperature, however, may be lower than zero degrees Celsius, for example, in cases where the humidity is relatively low.

According to another aspect of the invention, a method comprises: detecting the temperature of multiple locations of a evaporator surface with an infrared sensor; comparing the temperature of the multiple locations to a predetermined temperature; and controlling the system in response to said comparing.

Further objects, features and advantages of the present invention will become apparent from the detailed description of preferred embodiments that follows, when considered together with the accompanying figures of drawing.

DETAILED DESCRIPTION OF PREFERRED EMBODIMENTS

The present invention senses the temperature of the air outlet side of the evaporator using an infrared sensor. Preferably, temperature is measured over several different areas in which a cold spot may occur. More preferably, the infrared sensor continuously scans the whole surface on the air outlet side of the evaporator. The sensed temperature is used to detect any cold spots that may dynamically form on the evaporator surface.

According to one aspect of the invention, the sensed temperature is used to control an HVAC system in a vehicle. More specifically, the system may switch off the compressor in the HVAC system upon detection of one or more cold spots that may cause build-up of ice. Alternatively, the system may reduce the performance of a variable displacement compressor upon detection of one or more cold spots.

The invention provides several distinct advantages. First, by scanning over different areas of the evaporator surface rather than a single fixed location, dynamic cold spots may be detected. Thus, the system and method according to the invention operates independently of the refrigerant load and operating conditions that may change the locations of cold spots.

Additionally, the invention provides for decreased development and tuning time for the de-icing portion of a typical HVAC test program. Further, the control process for the infrared temperature sensing utilized with the invention can be derived from proven and well-established algorithms, such as those using computational fluid dynamics (CFD).

Further, IR sensors are very reliable. Accordingly, the invention may be used in a variety of applications and environments, such as trucks, where high durability is demanded.

The invention further enhances serviceability. Specifically, the IR sensor does not need to be removed and reinstalled in the evaporator core is serviced.

These advantages and others will be apparent to those skilled in the art from the following description of preferred embodiments of the invention. It should be understood that the following description is exemplary and is not intended to limit the invention.

Figure 1:
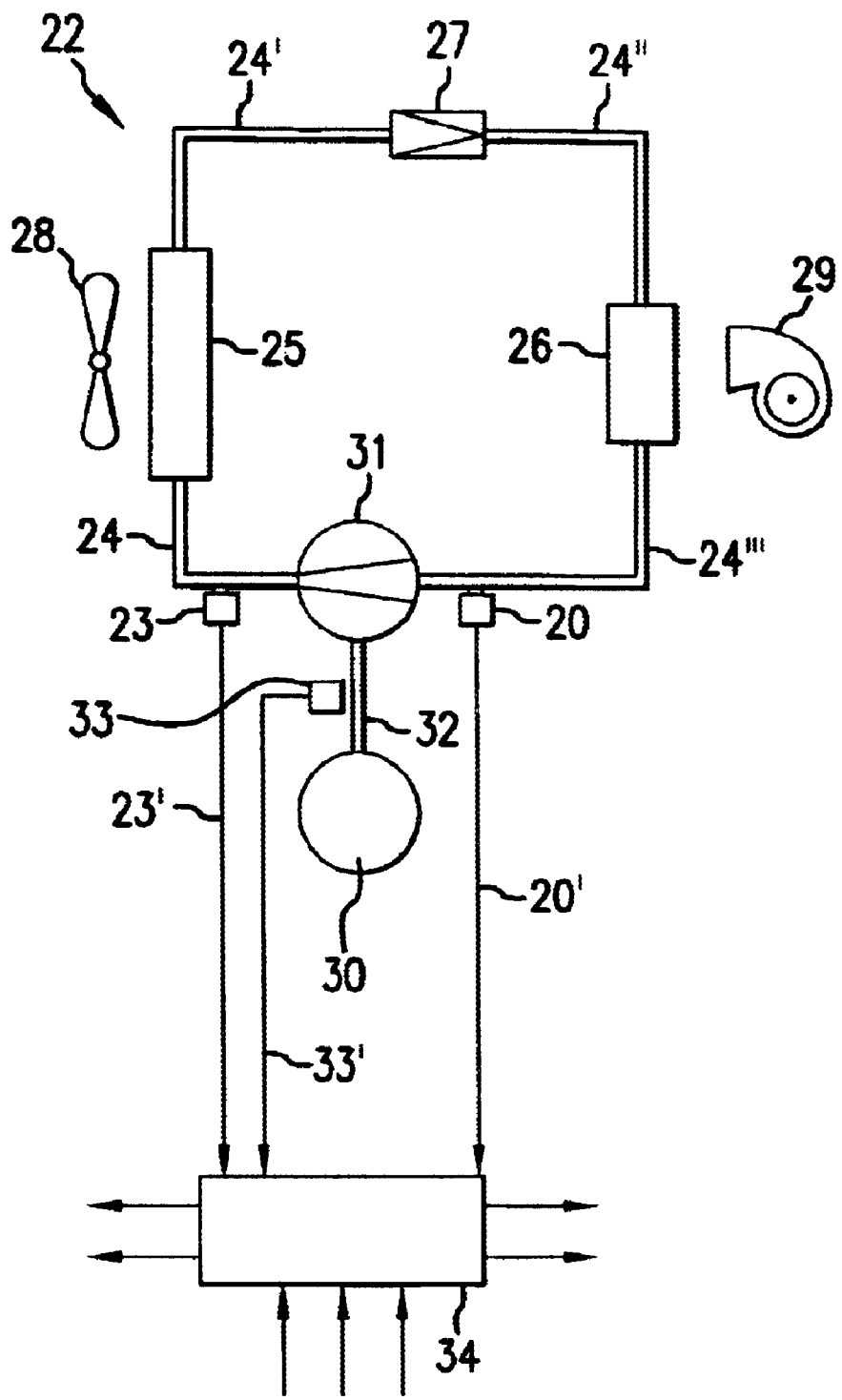
FIG. 1 is a diagram of a refrigerant circuit according to one embodiment of the invention.

FIG. 1 shows a refrigerant circuit 22 in which, by way of example, the invention may be utilized. Such a circuit is described in detail in commonly-owned U.S. Pat. No. 6,073, 457, the disclosure of which is hereby incorporated by reference in its entirety. The refrigerant circuit comprises a compressor 31, a condenser 25, an evaporator 26 and an expansion valve 27. The individual units 25, 26, 27, 31 are interconnected by means of pipelines 24, 24', 24", 24'". The refrigerant circuit 22 is filled with a suitable refrigerant including, for example, an oil-containing refrigerant such as R134a, and the like. The condenser 25 is assigned a condenser blower 28, and an evaporator blower 29 is provided for generating an air flow through the evaporator 26. The compressor 31 is coupled to an engine 30 by means of a drive shaft 32, said engine being, for example, an internal combustion engine driving a motor vehicle. The compressor may be any type as known in the art, including a fixed compressor, a variable displacement compressor, or an external controlled variable displacement compressor. The compressor is controlled to turn on or off (e.g., in the case of a fixed compressor), or it may be controlled to reduce performance (e.g., in the case of a variable displacement compressor).

The suction pressure sensor 20 is arranged on the pipeline 24'" on the suction side of the compressor 31, and a high pressure sensor 23 is provided on the high pressure side of the compressor 31 on the pipeline 24. A tachometer 33 is located in the direct vicinity of the drive shaft 32 in order to detect the respective speed at which the compressor 31 is being operated. The sensors 20, 23, 33 are connected to an electronic control device 34 by means of connecting lines 20', 23', 33'. The signals generated by the sensors 20, 23, 33 are fed to the electronic control device 34 so that operation of the compressor can be monitored. The electronic control device 34 is also fed further parameters, including those obtained using an infrared sensor as described in greater detail below. Such parameters may also comprise state variables, which are relevant for the air conditioning operation.

Figure 2:
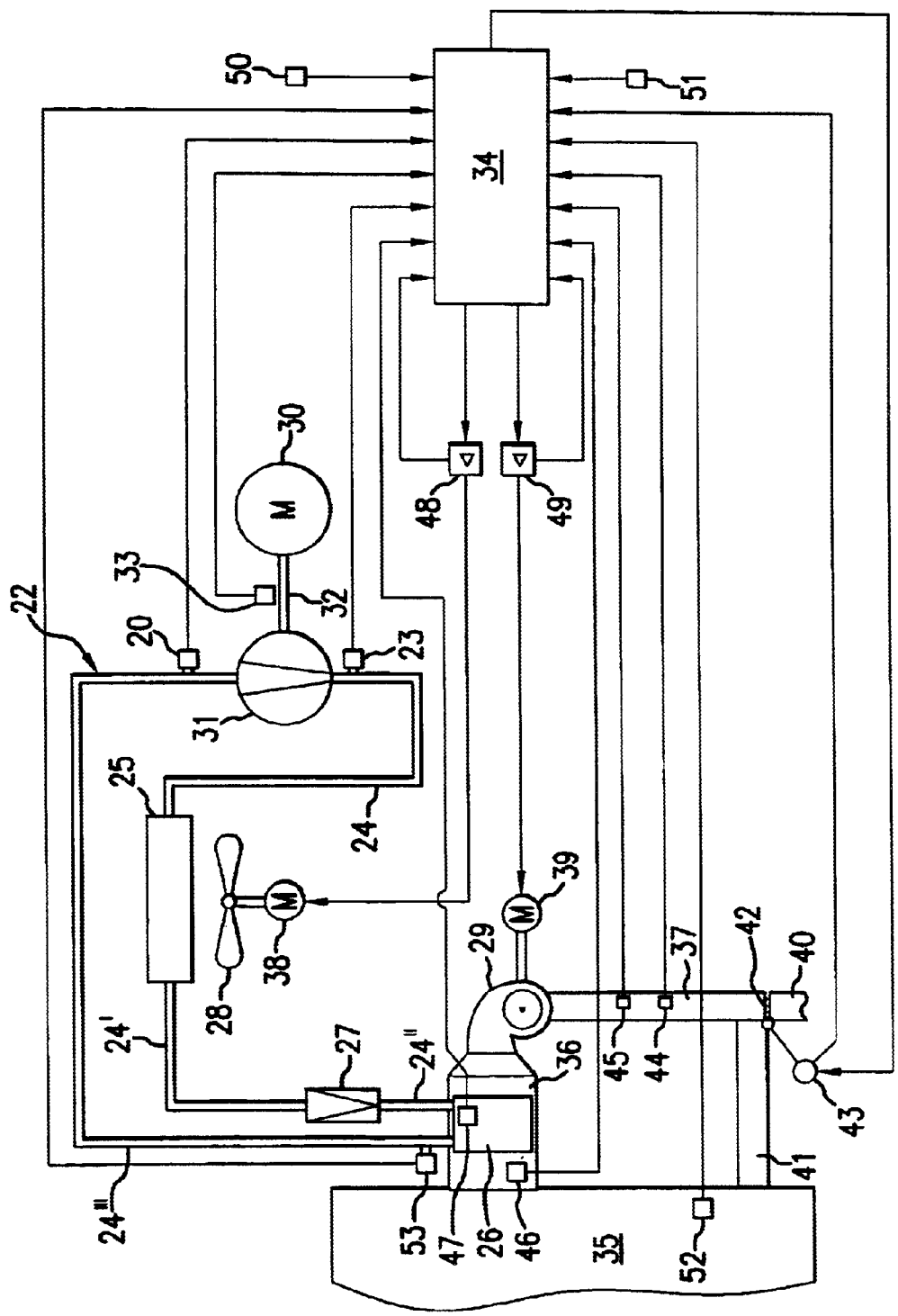
FIG. 2 is a diagram depicting a refrigerant circuit that corresponds in design to that described with reference to FIG. 1.

FIG. 2 depicts an exemplary refrigerant circuit 22 that corresponds in design to that described with reference to FIG. 1. As shown, the evaporator 26 is arranged in a supply air channel 36 for a passenger compartment 35 of a motor vehicle. Arranged upstream of the evaporator 26 in the air flow direction is the evaporator blower 29, which is connected on the suction side to an air guidance channel 37. Opening into the front end of the air guidance channel 37 is a fresh air channel 40 and a recirculating air channel 41, which can optionally be connected to the air guidance channel 37 by means of an air flap 42. The air flap 42, which is constructed as a fresh air/recirculating air flap, is coupled to a positioning motor 43, which is driven by the electric control device 34. The respective current position of the positioning motor 43 is detected and a corresponding signal is sent to the control device 34.

In accordance with a feature of the invention, in the system of FIG. 2, an IR temperature sensor 46 is provided on the outflow side of the evaporator 26 to sense the temperature of a surface of the evaporator. The operation of the infrared sensor 46 is described in greater detail below.

Other sensors may also be provided, depending on the specific design and operation of the HVAC system. For example, in the embodiment illustrated in FIG. 2, sensors 44 and 45 are located in the air guidance channel 37. Sensor 44 detects the humidity and sensor 45 detects the temperature of the air fed to the evaporator 26. An outside temperature sensor 50 and passenger compartment temperature sensor 52 are also provided, as are customary in motor vehicle air conditioners. Furthermore, a vehicle speed sensor 51 is provided to the electronic control device 34 to take into account, if necessary, the vehicle speed. In addition to the sensors 20 and 23 already described in relation to FIG. 1, for the suction pressure and the high pressure in the refrigerant circuit 22 in FIG. 2, there is arranged on the refrigerant circuit 22 on the output side of the evaporator 26 a refrigerant temperature sensor 53 whose signal may be used to determine overheating. Moreover, in this particular example, another temperature sensor 47 is optionally located inside the evaporator block.

Figure 3:
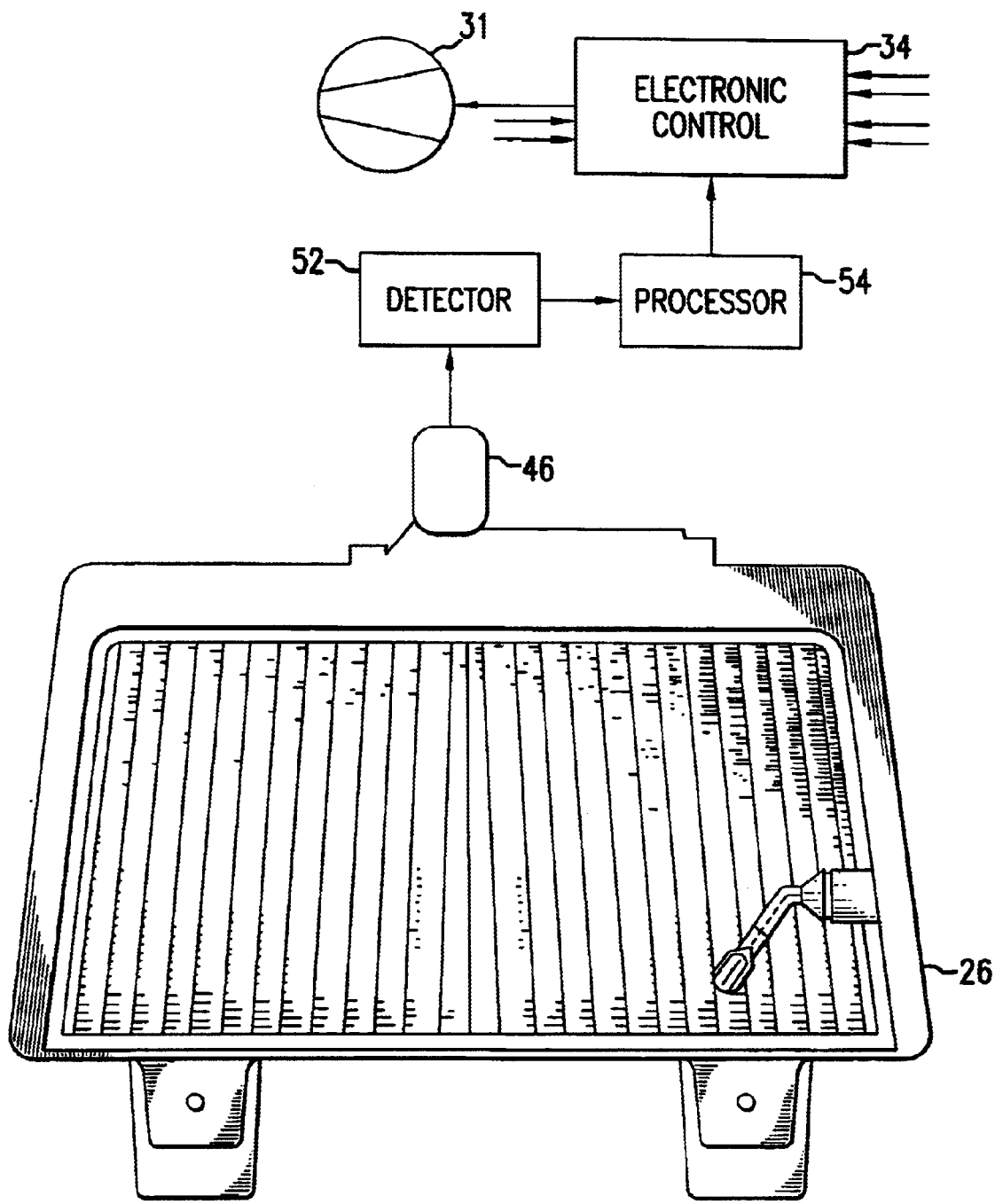
FIG. 3 is a top view of an infrared sensor 4 positioned on a surface in line of sight of the downstream side of the evaporator in accordance with an embodiment of the invention.

The IR sensor 46 is positioned to detect the temperature over several different areas on the outlet side of the evaporator 26. Preferably, the infrared sensor 46 is positioned to detect the temperature on the entire surface of the outlet side. One example of such a position is shown in FIG. 3, in which the IR sensor 46 is positioned on a surface in line of sight of the downstream side of the evaporator 26. It will be appreciated that other positions are possible, provided that consideration is given to ensure a clear line of sight and avoid blockage of the sensor or surface to be detected by particles, liquid or contaminants.

The invention is not necessarily limited to any specific type of IR sensor. Preferable, the IR sensor is configured to scan the entire surface of the evaporator 26. Scanning IR sensors are well known in the art. The construction and operation of one such IR sensor is described in U.S. Pat. No. 5,094,544, which is incorporated herein by reference in its entirety.

Figures 4A, 4B:
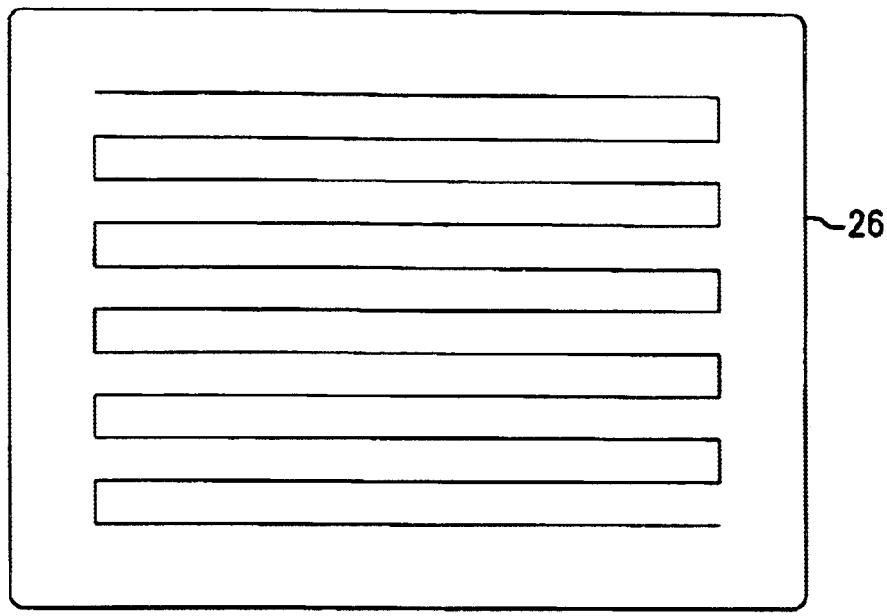
FIG. 4A illustrates the scan path of a scanning infrared sensor along the surface of the evaporator in accordance with an embodiment of the invention.
FIG. 4B illustrates individual regions of an evaporator surface, the temperatures of which are each determined by one or more infrared sensors in accordance with another embodiment of the invention.

As shown in FIG. 4A, a scanning IR sensor 46 scans the surface of the evaporator 26 in a fashion similar to the raster scan of an electron beam in a cathode ray tube. Thus, in this example, the IR sensor 46 scans back and forth in the x-direction, and moves up and down in a y-direction. As the IR sensor 46 scans the surface of the evaporator 26, it continuously outputs a signal, e.g., a voltage, that varies as a function of the temperature of the surface. Alternatively, as shown in FIG. 4B individual IR sensors may be provided to detect temperature at one or more regions, a-o, on the surface of the evaporator 26.

The signals from infrared sensor 46 must be processed to determine whether a cold spot has formed on the evaporator 26. It will be appreciated that this processing can be accomplished according to different techniques known in the art. Generally, processing involves proper detection of the raw output signal and determination of temperature based on the detected signal. In the example of FIG. 3, this is performed by a detector 52, which amplifies the raw signal from the IR sensor. The signals from the detector are then provided to a processor 54, which obtains a temperature from the detected signal according to techniques well known in the art.

Once the temperatures of the regions within the line of sight of the detector are obtained, they can be used by a controller, such as electronic control device 34, to control the system as desired. For example, the detected temperatures $T_D$ are compared to a predetermined threshold temperature $T_{TH}$. The predetermined threshold temperature may be, for example, a temperature at which ice may be expected to form, typically around zero degrees Celsius. It may be a value that is adjusted based on other environmental conditions, for example, humidity.

If the detected temperature is found to be below the predetermined threshold $T_{TH}$, the electronic control device 34 then turns off the compressor 31, allowing the evaporator surface to become warmer. Alternatively, the performance of a variable displaced compressor may be reduced by a control device in response to the detected temperature. To improve accuracy, several comparisons may be made and the compressor 31 is turned off (or its performance reduced) only if the detected temperature $T_D$ is found to be below the threshold temperature $T_H$ over some predetermined period of time that may encompass several measurements.

Figure 5:
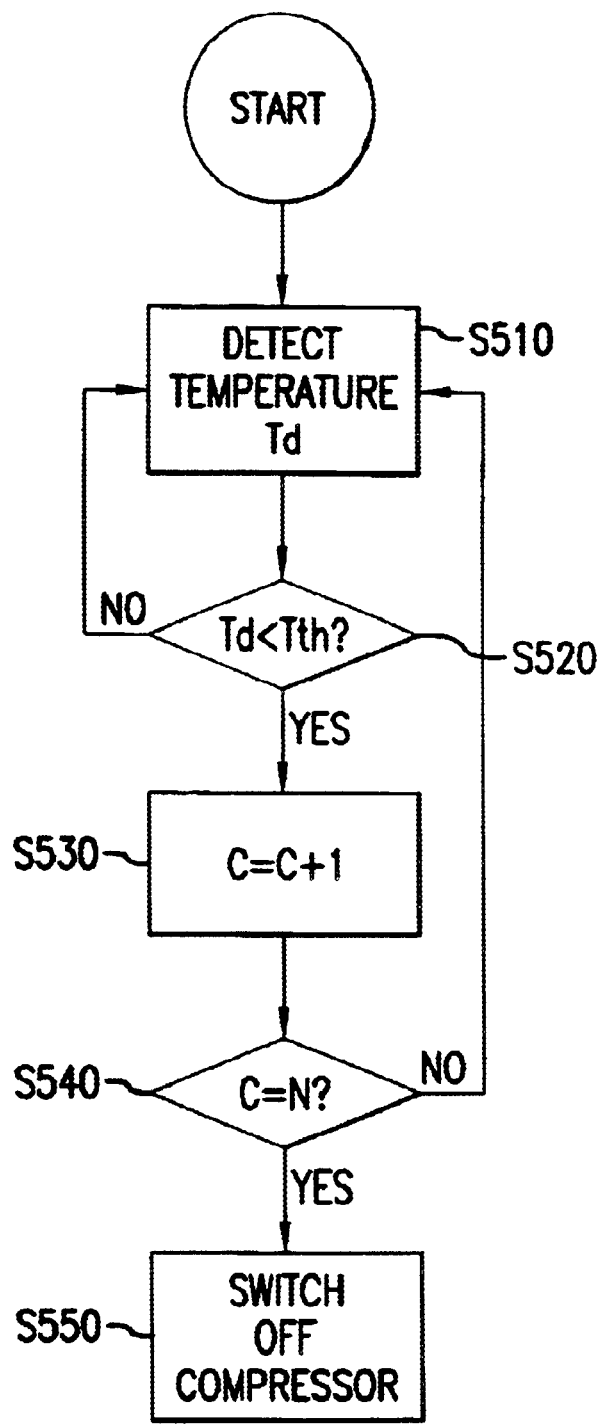
FIG. 5 is a flowchart generally illustrating the operation of the invention.

This general operation is illustrated in FIG. 5. In step S510, a temperature signal corresponded to the temperature at $T_D$ an area of the evaporator located on the scan path of the sensor is detected. In step 520, the detected temperature $T_D$ is compared to a predetermined threshold temperature $T_{TH}$. If the detected temperature $T_D$ is greater than the threshold temperature $T_{TH}$, then the method repeats itself. If the detected temperature is less than the threshold temperature $T_{TH}$, then a counter is incremented. If the temperature $T_D$ exceeds the threshold for some predetermined period as measured by the counter (S540) then the electronic control device 34 switches off the compressor 31 (S550). The system can then continue to monitor temperature to determine if all cold spots are no longer detectable, and then turn on the compressor. Alternatively, the performance of a variable compressor could be adjusted based on the detected temperature, rather than completely shutting it on and off.

It will be appreciated that the detector 52, processor 54 and controller or electronic control device 34 may be implemented in hardware or software or some combination of both. Further, they may be implemented by the same device or by separate, dedicated devices. For example, the processor 54 may include an analog to digital (A/D) converter and a dedicated microprocessor programmed to calculate detected temperatures $T_D$ and compare those temperature with a predetermined temperature $T_{TH}$. Preferably, the microprocessor may comprise a low cost, high speed 16-bit/24-bit processor with built-in digital signal processing instructions for floating point calculations. Such processor 54 may include associated memory to store software for controlling operation of the CPU, to store data for comparison with sensed data, or to support computation by the CPU. Such "dedicated" processor provide signals to the electronic control device 34 indicating that the evaporator is found to have a cold spot or has not been found to have a cold spot, and the electronic control device 34 controls the compressor or other elements of the HVAC system accordingly.

Alternatively, signals from the detector 52 may be converted to a digital form and provided directly to a vehicle computer, which may correspond to the electronic control device 34. In such case, the vehicle computer handles all necessary calculations to detect a cold spot and control the HVAC.

From the foregoing description, it will be understood that the basic principle of the present invention is may also be used in other applications, for example, to control discharge temperature for a water-valved system and the mixing chamber of an air blending unit. It could also be exported to external system to change the speed and/or volume of a variable displacement compressor.

Further, it will also be apparent that various alternative designs and enhancements are possible. For example, more than one IR sensor may be used in conjunction with the invention to improve accuracy and compensate for environmental-specific variations. Thus, while particular embodiments according to the invention have been illustrated and described above, it will be clear that the invention can take a variety of forms and embodiments within the scope of the appended claims.

What is claimed is:

1. A system for sensing temperature for control of an HVAC system comprising:
   an evaporator having a surface;
   at least one infrared sensor configured to detect the temperature of multiple areas of the evaporator surface;
   a processor configured to determine whether the detected temperature of at least one of said multiple areas of the evaporator surface is below a threshold temperature; and
   a controller configured to control operation of the HVAC system in response to a determination as to whether the detected temperature at at least one of said multiple areas of the evaporator surface is below the threshold temperature.

2. The system according to claim 1, wherein said multiple areas encompass substantially the entirety of the air outlet side of the evaporator.

3. The system according to claim 1, wherein the evaporator surface is scanned line by line in a raster pattern.

4. The system according to claim 1, wherein the evaporator surface is scanned with one or more sensors, each of which detects temperature at one or more of said multiple areas.

5. The system according to claim 1, wherein the controller limits performance of an HVAC compressor when the detected temperature of at least one of said multiple areas of the evaporator surface is determined to be below the threshold temperature.

6. The system according to claim 1, wherein the predetermined temperature is zero degrees Celsius.

7. The system according to claim 1, wherein said processor is configured to determine whether the temperature at each of said multiple areas is below said threshold temperature, and said controller is configured to limit performance of an HVAC compressor when the detected temperature at one or more of said multiple areas is determined to be below said threshold temperature.

8. The system according to claim 7, wherein said at least on infrared sensor comprises a single infrared sensor, said single infrared sensor being configured to scan each of said multiple areas in succession and output a temperature signal for each of said multiple areas, said processor comparing said temperature signal output from said sensor to said threshold temperature.

9. The system according to claim 7, wherein said at least one infrared sensor comprises multiple infrared sensors, each of said multiple infrared sensors being configured to detect the respective temperature of a corresponding one of said multiple areas and output a temperature signal for each of said multiple areas, said processor comparing said temperature signal output from each of the multiple sensors to said threshold temperature.

10. In an air conditioning system including an evaporator, a condenser and a controller, a method comprising:
    detecting the temperature of multiple locations on an evaporator surface with an infrared sensor;
    comparing the detected temperature of at least one of the multiple locations to a predetermined temperature; and
    controlling the system in response to said comparing.

11. The method according to claim 10, wherein detecting includes scanning substantially the entirety of the air outlet side of the evaporator.

12. The method according to claim 10, wherein controlling the system comprises switching off the compressor if at least one of the locations is at or below the predetermined temperature.

13. The method according to claim 10, wherein the predetermined temperature is zero degrees Celsius.

14. The method according to claim 10, wherein the air conditioning system regulates air temperature in a vehicle.

15. The method according to claim 10, wherein comparing includes comparing the temperature of each of the multiple locations to a predetermined temperature, and controlling includes limiting performance of an HVAC compressor when the detected temperature at one or more of said multiple locations is determined to be below said threshold temperature.

16. The method according to claim 15, wherein a single infrared sensor scan each of said multiple locations in succession and output a temperature signal for each of said multiple locations, and each temperature signal is compared to said threshold temperature.

17. The method according to claim 15, wherein detecting includes detecting the temperature of said multiple locations on said evaporator surface with multiple infrared sensors, each of said multiple infrared sensors being configured to detect the respective temperature of a corresponding location, each respective temperature being compared to said threshold temperature.

18. An apparatus for controlling an air conditioning system, the apparatus comprising:
    an infrared sensor configured to detect the temperature of multiple locations on an evaporator surface;
    means for comparing the temperature of at least one of the multiple locations to a predetermined temperature; and
    means for controlling the system in response to said comparing.

19. The apparatus according to claim 18, wherein said infrared sensor is configured to scan substantially the entirety of the air outlet side of the evaporator.

20. The apparatus according to claim 18, wherein said means for controlling comprises includes means for switching off the compressor if at least one of the locations is at or below the predetermined temperature.

21. The apparatus according to claim 18, wherein the predetermined temperature is zero degrees Celsius.

22. The apparatus according to claim 18, wherein the air conditioning system regulates air temperature in a vehicle.

23. The apparatus according to claim 18, wherein said means or comparing compares the temperature of each of the multiple locations to a predetermined temperature, and said means for controlling limits performance of an HVAC compressor when the detected temperature at one or more of said multiple locations is determined to be below said threshold temperature.

24. The apparatus according to claim 23, wherein a single infrared sensor scans each of said multiple locations in succession and output a temperature signal for each of said multiple locations, and said means for comparing compares each temperature signal to said threshold temperature.

25. The method according to claim 23, wherein each of a plurality of infrared sensors are configured to detect the respective temperature at a corresponding one of said multiple locations on said evaporator, and said means for comparing compares each respective temperature wish said threshold temperature.

* * * * *